US010785605B1

(12) United States Patent
Park et al.

(10) Patent No.: US 10,785,605 B1
(45) Date of Patent: Sep. 22, 2020

(54) METHOD OF PROVIDING LOCATION INFORMATION OF ACQUAINTANCE

(71) Applicants: In Tae Park, Seoul (KR); Sung Uk Jang, Seongnam-si (KR)

(72) Inventors: In Tae Park, Seoul (KR); Sung Uk Jang, Seongnam-si (KR)

( * ) Notice: Subject to any disclaimer, the term of this patent is extended or adjusted under 35 U.S.C. 154(b) by 0 days.

(21) Appl. No.: 16/845,863

(22) Filed: Apr. 10, 2020

(30) Foreign Application Priority Data

Jun. 7, 2019 (KR) .................. 10-2019-0067602

(51) Int. Cl.
*H04W 4/029* (2018.01)
*G06Q 30/06* (2012.01)
*H04W 4/024* (2018.01)

(52) U.S. Cl.
CPC ........ *H04W 4/029* (2018.02); *G06Q 30/0641* (2013.01); *H04W 4/024* (2018.02)

(58) Field of Classification Search
CPC .............................. H04W 4/029; H04W 4/024
USPC ...................................................... 455/456.3
See application file for complete search history.

(56) References Cited

U.S. PATENT DOCUMENTS

2014/0136328 A1* 5/2014 Abhyanker .......... G06Q 10/087
 705/14.58
2020/0107155 A1* 4/2020 Williams ................ G06F 21/36

FOREIGN PATENT DOCUMENTS

KR 10-2007-0001452 A 1/2007
KR 10-2012-0137637 A 12/2012
KR 10-1516998 B1 5/2015
KR 10-2015-0066229 A 6/2015

OTHER PUBLICATIONS

Notice of Final Rejection issued by Korean Intellectual Property Office dated Oct. 8, 2019.
Grant of Patent issued by Korean Intellectual Property Office dated Nov. 11, 2019.

* cited by examiner

*Primary Examiner* — Chuck Huynh
(74) *Attorney, Agent, or Firm* — Sughrue Mion, PLLC

(57) ABSTRACT

Provided is a method including a location-sharing acquaintance registration process, a location-sharing acquaintance location information receiving process in which the acquaintance location sharing application receives location information of location-sharing acquaintances present within a preset proximity radius from a current location of the user from the location information providing server, a location-sharing acquaintance distance display process in which the acquaintance location sharing application displays only the number and separation distances of location-sharing acquaintances present within the proximity radius of the user without identification information of the location-sharing acquaintances as long as the location-sharing acquaintances are present within the proximity radius, and a paid location-sharing acquaintance identification information providing process in which the acquaintance location sharing application provides the identification information of the location-sharing acquaintances present within the proximity radius of the user in return for a payment.

5 Claims, 7 Drawing Sheets

METHOD OF PROVIDING LOCATION INFORMATION OF ACQUAINTANCE

CROSS-REFERENCE TO RELATED APPLICATION

This application claims priority to and the benefit of Korean Patent Application No. 10-2019-0067602, filed on Jun. 7, 2019, the disclosure of which is incorporated herein by reference in its entirety.

BACKGROUND

1. Field of the Invention

The present invention relates to a method of providing location information, and more particularly, to a method of providing location information of a user's acquaintances such as family members and friends.

2. Discussion of Related Art

After smart phones are released, the supply and spread of mobile communication terminals, such as current smart phones, are drastically increasing in speed, and there is an expanding trend of the age group of use.

Further, as a technology for measuring the location of a mobile object is developed due to an improvement in the mobile communication technology and the satellite communication technology, a service industry for providing information obtained by measuring the location of a mobile object is continuously increasing in scale.

Such locating can be applied to any terminal capable of wirelessly transmitting and receiving data. For example, there are many wireless terminals such as personal mobile communication terminals and navigators carried by pedestrians or installed in vehicles. As a locating method of such a wireless terminal, various measurement methods including base transceiver station (BTS)-based locating and global positioning system (GPS)-based locating can be applied.

Various methods for measuring the location of a wireless terminal have their advantages and disadvantages. For example, in the case of providing a service for locating a mobile communication terminal in which no GPS equipment is installed or which is present in a building interior where GPS locating is unavailable, location information is provided according to information of a BTS which is stored in a subscriber visitor location register (VLR) and to which the mobile communication terminal belongs.

Location-based services installed in mobile communication terminals, such as smart phones, are provided in various application forms. For example, various applications for sharing location information among users are provided.

In other words, according to existing location-based services, acquaintances consent to share their location information among themselves and then identify locations thereof through an application using a GPS.

These acquaintance locating applications generate revenue from payments for obtaining more information about a counterpart than location information. For example, an acquaintance locating application generates revenue from payments for service such as notification of details of movement for one month and 24 hour location notification.

However, in the case of such an existing acquaintance locating application, as long as acquaintances consent to share their location information among themselves, location information of an acquaintance is unconditionally provided to a counterpart. Consequently, the acquaintance locating application has a problem in the protection of private information.

In addition, the existing acquaintance locating application can generate revenue only by additionally providing information other than location information.

RELATED ART DOCUMENT

Patent Document (Patent Document 0001) (Related Art Document 1) Korean Patent Application Publication No. 10-2007-0001452

SUMMARY OF THE INVENTION

The present invention is directed to providing a method of strengthening the protection of private information which is problematic in existing location information providing methods.

The present invention is also directed to providing an efficient revenue generation method in an application for providing location information.

According to an aspect of the present invention, there is provided a method of providing location information of an acquaintance by an acquaintance location sharing application installed in a user terminal, the method including a location-sharing acquaintance registration process in which the acquaintance location sharing application registers counterparts who consent to provide their location information as location-sharing acquaintances of a user with a location information providing server, a location-sharing acquaintance location information receiving process in which the acquaintance location sharing application receives location information of location-sharing acquaintances who are present within a preset proximity radius from a current location of the user from the location information providing server, a location-sharing acquaintance distance display process in which the acquaintance location sharing application displays only the number and separation distances of location-sharing acquaintances who are present within the proximity radius of the user without identification information of the location-sharing acquaintances as long as the location-sharing acquaintances are present within the proximity radius, and a paid location-sharing acquaintance identification information providing process in which the acquaintance location sharing application provides the identification information of the location-sharing acquaintances who are present within the proximity radius of the user in return for a payment.

The location-sharing acquaintance distance display process may include, when a payment is made, grouping the location-sharing acquaintances and displaying only separation distances of location-sharing acquaintances belonging to any one group.

The grouping of the location-sharing acquaintances may include grouping the location-sharing acquaintances by their acquaintance attributes or automatically grouping the location-sharing acquaintances with an increase in the number of acquaintances rather than grouping the location-sharing acquaintances by their acquaintance attributes.

The location-sharing acquaintance distance display process may include displaying only separation distances of location-sharing acquaintances belonging to a group selected by the user.

The location-sharing acquaintance distance display process may include displaying only separation distances of location-sharing acquaintances belonging to a group determined on the basis of the current location.

The method may further include raising a deviation alarm when a location-sharing acquaintance belonging to a group selected by the user or determined on the basis of the current location deviates from the proximity radius on the basis of the current location of the user and raising a return alarm when the location-sharing acquaintance comes within the proximity radius on the basis of the current location of the user.

The method may further include transmitting, by the location information providing server, a deviation notification message for notifying of deviation to the location-sharing acquaintance who deviates from the proximity radius on the basis of the current location of the user.

The paid location-sharing acquaintance identification information providing process may include, when the user selects a location-sharing acquaintance present within the proximity radius, transmitting, by the acquaintance location sharing application, a paid identification message to the selected location-sharing acquaintance and, when the location-sharing acquaintance who receives the paid identification message consents to identification, displaying, by the acquaintance location sharing application, identification information and location information of the location-sharing acquaintance.

The method may further include, when the location-sharing acquaintance consents to identification, opening a chat room between the user and the location-sharing acquaintance to display the identification information and the location information of the location-sharing acquaintance and, when a certain period of time passes without conversation after the chat room is opened, displaying only a distance as is originally done.

The paid location-sharing acquaintance identification information providing process further includes giving points to the location-sharing acquaintance who consents to identification.

The method may further include a paid location-sharing acquaintance location information providing process of providing, by the acquaintance location sharing application, the location information of the location-sharing acquaintances present within the proximity radius of the user without the identification information of the location-sharing acquaintances in return for a payment.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete and will fully convey the scope of the present invention to those of ordinary skill in the art. The present invention is only defined by the scope of the claims. Also, in describing the present invention, when it is determined that associated well-known art and the like may obscure the gist of the present invention, detailed description thereof will be omitted.

Figure 1:
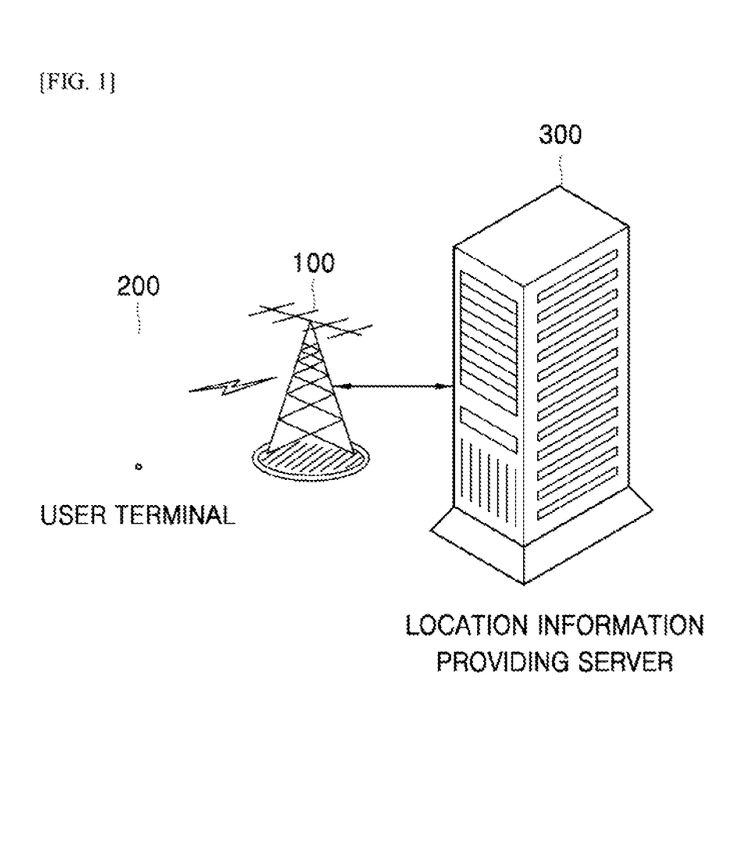
FIG. 1 shows a configuration of a system for providing acquaintance location information according to an exemplary embodiment of the present invention.
Figure 2:
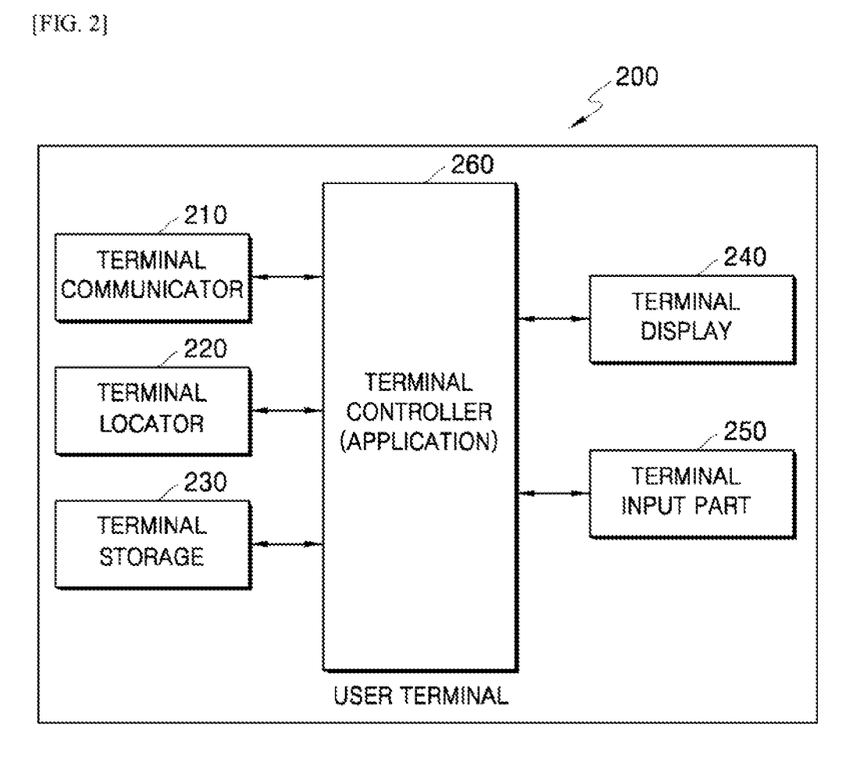
FIG. 2 is a block diagram of a user terminal according to an exemplary embodiment of the present invention.

FIG. 1 shows a configuration of a system for providing acquaintance location information according to an exemplary embodiment of the present invention, and FIG. 2 is a block diagram of a user terminal according to an exemplary embodiment of the present invention.

The system for providing acquaintance location information according to the exemplary embodiment of the present invention gets a counterpart's consent to provide his or her location information and registers him or her but displays only distances of people who are present near a user without directly exposing identifications and directions of the people. When an acquaintance comes within a proximity radius of the user, only his or her distance is displayed in the acquaintance location sharing application. Here, the proximity radius is a distance which is set in advance in the acquaintance location sharing application and is not changed by the user at will. Distance information is provided in three levels, and the number of acquaintances who correspond to the distance information and give their consent is displayed.

When the user wants to know who the counterpart is, the user transmits a message to the counterpart to check who the counterpart is. In this case, a message function in the acquaintance location sharing application is used, and a payment is made when the message is transmitted. When the counterpart who receives the message gives his or her consent, he or she may receive a certain amount of money as points which can be used in the service, that is, points which can also be used in a partner company.

The counterpart cannot state his or her intention of rejecting the message, and the message automatically disappears after a certain period of time. After the counterpart gives his or her consent, his or her location information may be accurately displayed in a map, and the map returns to an original state thereof after a certain period of time.

To this end, the system for providing acquaintance location information according to the exemplary embodiment of the present invention may include a wired or wireless communication network 100, a location information providing server 300, and a user terminal 200.

The wired or wireless communication network 100 is a communication network which provides wired communication or wireless communication between the location information providing server 300 and the user terminal 200. When the wired or wireless communication network 100 is implemented as a wireless communication network, data communication may be performed using a wireless mobile communication network including a base transceiver station (BTS), a mobile switching center (MSC), and a home location register (HLR). Also, when the wired or wireless communication network 100 is implemented as a wired communication network, the wired or wireless communication network 100 may be implemented as a network communication network, and data communication may be performed according to an Internet protocol such as transmission control protocol/Internet protocol (TCP/IP).

The location information providing server 300 has the same hardware configuration as a general web server and includes a software program module which is implemented in various languages, such as C, C++, Java, Visual Basic, and Visual C, to perform various functions. Also, the location information providing server 300 may be implemented using web server programs which are variously provided in hardware for a general server according to operating systems (OSs) such as disk operating system (DOS), Windows, Linux, Unix, and macOS.

The location information providing server 300 having such software and hardware performs a consent procedure for location sharing between a user and an acquaintance. When an acquaintance consents to location sharing (hereinafter "location-sharing acquaintance"), the location information providing server 300 receives location information of the location-sharing acquaintance from a terminal of the location-sharing acquaintance. When a location-sharing acquaintance is within the proximity radius from a current location of the user, the location information providing server 300 provides location information of the location-sharing acquaintance to the user terminal 200. In this case, the user terminal 200 receiving the location information of the location-sharing acquaintance displays only a separation distance without identification information of the location-sharing acquaintance who is present within the proximity radius. This is intended to provide identification information and accurate location information in return for a payment.

The user terminal 200 is a terminal used by a user and may include a terminal communicator 210, a terminal locator 220, a terminal storage 230, a terminal display 240, a terminal input part 250, and a terminal controller 260 as shown in FIG. 2.

The terminal communicator 210 is a module which functions to communicate through a mobile communication network and includes a radio frequency (RF) transmitter (not shown) which up-converts and amplifies a frequency of a wireless transmission signal during mobile communication, such as third generation (3G) communication or fourth generation (4G) communication, an RF receiver (not shown) which performs low-noise amplification on a received wireless signal and down-converts a frequency of the received wireless signal during mobile communication, and the like.

The terminal locator 220 is a module for detecting the location of the user terminal 200. The terminal locator 220 may detect the terminal location by receiving global positioning system (GPS) information from GPS satellites, detect the terminal location on the basis of the location of a mobile communication BTS, or detect the terminal location on the basis of a beacon location detected through beacon communication with a nearby beacon device.

The terminal storage 230 is a repository for storing an acquaintance location sharing application installation program of the present invention, screen graphical user interface (GUI) information, and the like. Such a storage is a module for inputting and outputting information, such as a flash memory, a compact flash (CF) card, and a secure digital (SD) card, and may be provided in the user terminal 200 or an additional device.

The terminal display 240 is a module for displaying an acquaintance location sharing screen and the like to the user.

The terminal input part 250 is a module for receiving an input from the user through the acquaintance location sharing screen displayed on the terminal display 240 and the like. The terminal input part 250 and the terminal display 240 may be integrated with a touchscreen panel. The touchscreen panel provides a touchscreen for receiving an input while displaying data. The touchscreen panel is a display window provided on a front side of the user terminal 200 to display a task screen and displays a GUI for interaction with the user.

The terminal controller 260 is implemented as a main control unit (MCU) for controlling each functional module of the user terminal 200 and is a module in which the acquaintance location sharing application of the present invention is installed. In the user terminal 200 implemented as a smart phone or the like, hundreds of various applications may be installed, added, or removed as desired by the user. Also, the user may create a desired application in person and implement an interface suitable for himself or herself through various applications. The acquaintance location sharing application may be downloaded from Google Play, App Store, etc. and installed on a smart phone.

The acquaintance location sharing application registers counterparts who consent to provide their location information with the location information providing server 300 as location-sharing acquaintances of the user. The acquaintance location sharing application receives location information of a location-sharing acquaintance who is present within the preset proximity radius from a current location of the user from the location information providing server 300 and displays only a separation distance of the location-sharing acquaintance without his or her identification information as long as the location-sharing acquaintance is determined to be present within the proximity radius from the user on the basis of the received location information of the location-sharing acquaintance. The identification information of the location-sharing acquaintance who is present within the proximity radius of the user may be provided in return for a payment. This will be described in detail below with reference to FIGS. 3 to 7.

Figure 3:
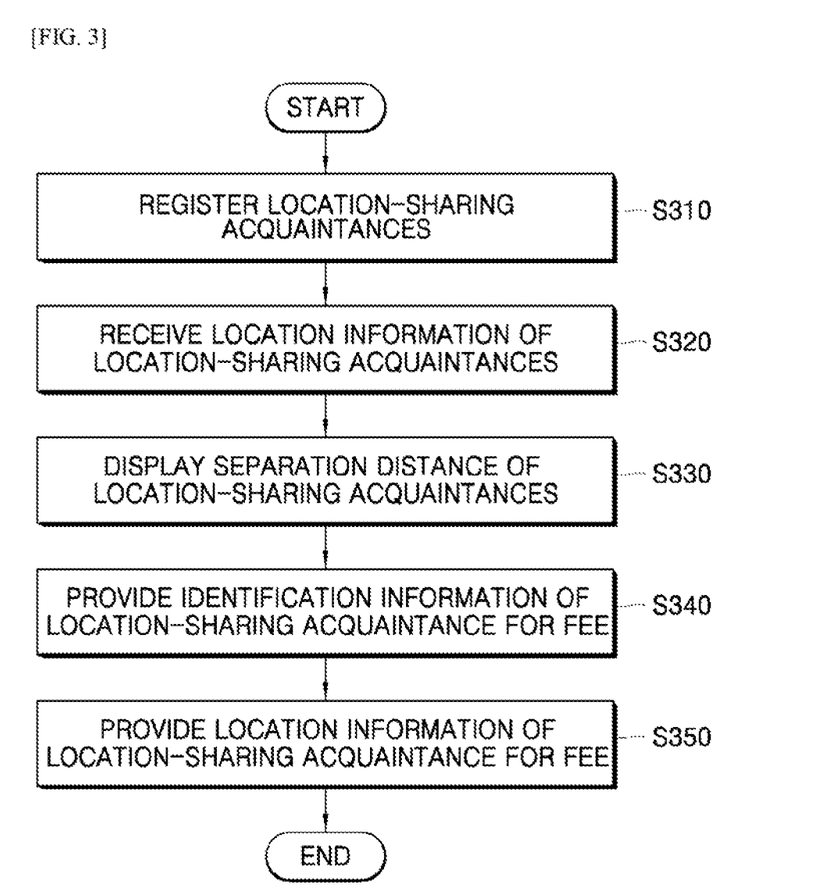
FIG. 3 is a flowchart of a method of providing acquaintance location information according to an exemplary embodiment of the present invention.
Figure 4:
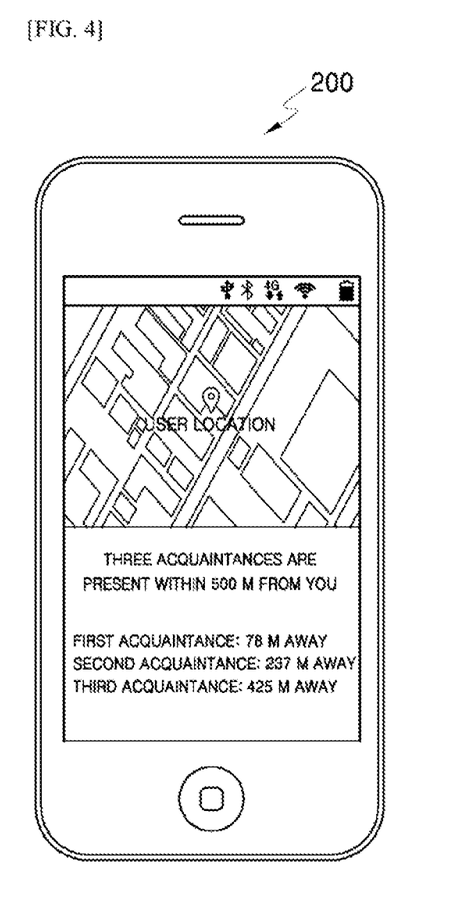
FIG. 4 is an example of a user terminal displaying only the number and separation distances of location-sharing acquaintances present within a proximity radius of a user according to an exemplary embodiment of the present invention.
Figure 5:
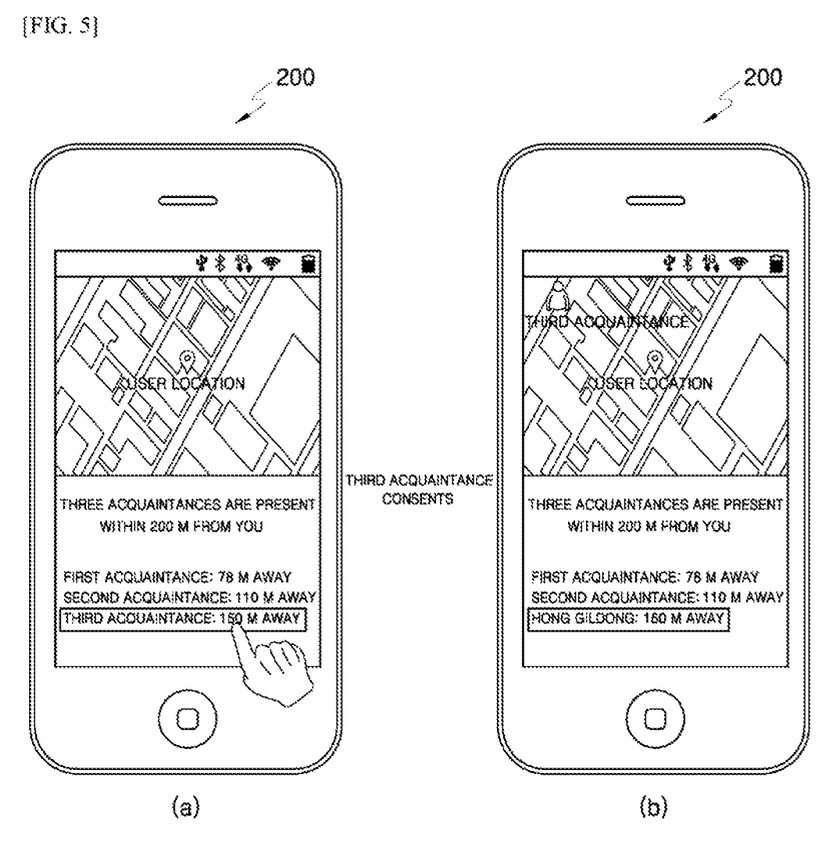
FIG. 5 is an example in which identification information and location information of a location-sharing acquaintance is displayed according to an exemplary embodiment of the present invention.
Figure 6:
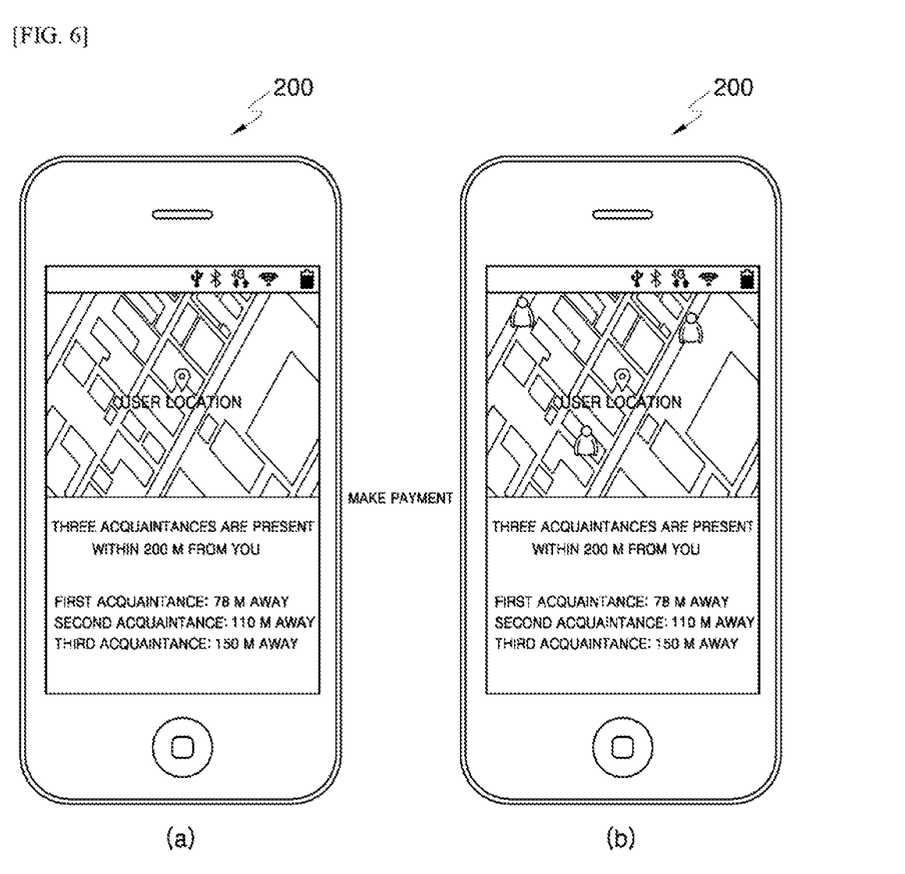
FIG. 6 is an example in which only location information is provided in return for a payment according to an exemplary embodiment of the present invention.
Figure 7:
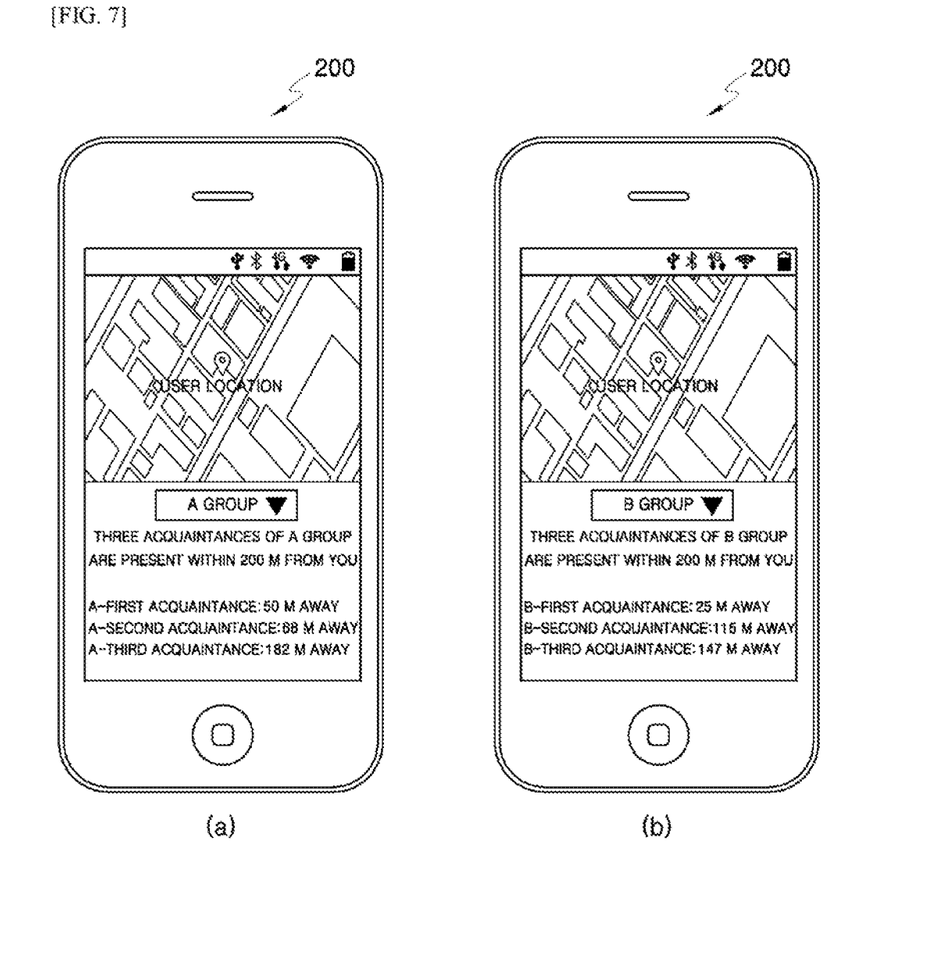
FIG. 7 is an example in which group-specific separation distances are displayed according to an exemplary embodiment of the present invention.

FIG. 3 is a flowchart of a method of providing acquaintance location information according to an exemplary embodiment of the present invention, FIG. 4 is an example of a user terminal displaying only the number and separation distances of location-sharing acquaintances present within a proximity radius of a user according to an exemplary embodiment of the present invention, FIG. 5 is an example in which identification information and location information of a location-sharing acquaintance is displayed according to an exemplary embodiment of the present invention, FIG. 6 is an example in which only location information is provided in return for a payment according to an exemplary embodiment of the present invention, and FIG. 7 is an example in which group-specific separation distances are displayed according to an exemplary embodiment of the present invention.

As shown in FIG. 3, the method of providing location information of an acquaintance by the acquaintance location sharing application installed on the user terminal 200 may include a location-sharing acquaintance registration process S310 in which the acquaintance location sharing application registers counterparts who consent to provide their location information as location-sharing acquaintances of the user with the location information providing server 300, a location-sharing acquaintance location information receiving process S320 in which the acquaintance location sharing application receives location information of location-sharing acquaintances who are present within the preset proximity radius from a current location of the user from the location information providing server 300, a location-sharing acquaintance distance display process S330 in which the acquaintance location sharing application displays only the number and separation distances of location-sharing acquaintances who are present within the proximity radius of the user without identification information of the location-sharing acquaintances as long as the location-sharing acquaintances are present within the proximity radius, and a paid location-sharing acquaintance identification information providing process S340 in which the acquaintance location sharing application provides the identification information of the location-sharing acquaintances who are present within the proximity radius of the user in return for a payment. In addition, the method may further include a paid location information providing process. The method will be described in detail below.

The location-sharing acquaintance registration process 310 is a process in which the acquaintance location sharing application registers counterparts who consent to provide their location information as location-sharing acquaintances of the user with the location information providing server 300. For example, when the user's acquaintances A, C, D, and F among the user's friends A, B, and C and the user's family members D, E, and F consent to share their locations with the user, the friends A and C and the family members D and F are registered as location-sharing acquaintances of the user.

The location-sharing acquaintance location information receiving process S320 is a process in which the acquaintance location sharing application receives location information of location-sharing acquaintances who are present within the preset proximity radius from a current location of the user from the location information providing server 300. The location information may correspond to the accurate location (e.g., latitude and longitude information or GPS information) of the location-sharing acquaintance within the proximity radius.

The proximity radius is a distance which is set in advance in the acquaintance location sharing application and is not changed by the user at will. In some cases, however, the proximity radius may be changed in return for a payment or the like.

Such a proximity radius may be set in various ways for the user's convenience.

As an example, some distance levels are basically set, and further distance levels may be settable when the user wants to know a wider area.

For example, the user may set a next level to 40 km or less. In this case, when an acquaintance who sets a next level to 40 km or an acquaintance who sets a next level to 50 km is within a distance of 40 km from the user, only location information is anonymously displayed. Also, when an acquaintance who sets a next level to 30 km or 35 km is 40 km away from the user, the acquaintance and the user are not displayed to each other. This is because it is irrational to display one person to the other person and not to display the other person to the person.

Such proximity radius setting may be implemented so that the proximity radius may be changed for a fee. For example, the user may increase the radius when going to another province or a place for a trip such as Hawaii. When the user is in the same place at the same time as his or her acquaintance, they may thereafter say "Oh, I went there last week . . . " to each other. According to the present invention, acquaintances may find that they are in the same place at the same time. When the proximity range is changeable for a fee, the proximity range may be increased so that a service range may be increased. For reference, such proximity radius setting may be implemented so that the proximity radius may be changed for free.

The location-sharing acquaintance distance display process S330 is a process in which the acquaintance location sharing application displays only the number and separation distances of location-sharing acquaintances who are present within the proximity radius of the user without identification information of the location-sharing acquaintances on the basis of the location information of the location-sharing acquaintance as long as the location-sharing acquaintances are present within the proximity radius. Even when identification information and location information of location-sharing acquaintances present within the proximity radius of the user are received from the location information providing server 300, all the pieces of information are not displayed, and only the number and separation distance of location-sharing acquaintances present within the proximity distance are displayed as shown in FIG. 4.

The paid location-sharing acquaintance identification information providing process S340 is a process in which the acquaintance location sharing application provides the identification information of the location-sharing acquaintances who are present within the proximity radius of the user in return for a payment.

The identification information is information for identifying the names and the like of the location-sharing acquaintances present within the proximity radius. After the identification information is received from the location information providing server 300 together with the location information in the location information receiving process S320, only the location information is displayed, and the identification information is displayed only in return for a payment.

Alternatively, only the location information is received in the location information receiving process S320, and the identification information is received from the location information providing server 300 and displayed in return for a payment.

The paid location-sharing acquaintance identification information providing process S340 includes a process in which the acquaintance location sharing application transmits a paid identification message to a selected location-sharing acquaintance and a process in which the acquaintance location sharing application displays identification information and location information of the location-sharing acquaintance only when the location-sharing acquaintance receiving the paid identification message consents to identification.

For example, when the user wonders who a third acquaintance 150 m away from the user is and selects the third acquaintance as shown in (a) of FIG. 5, an identification message is transmitted to the third acquaintance to identify the third acquaintance. In this case, a message function is used in the acquaintance location sharing application, and a payment is made to transmit the message. When the third acquaintance receiving the message gives his or her consent, the third acquaintance may receive a certain amount of money as points which can be used in the service, that is, points which can also be used in a partner company.

After the third acquaintance's consent, the location information and the name of the third acquaintance are accurately displayed as shown in (b) of FIG. 5. For reference, the third acquaintance cannot state his or her intention of rejecting the message, and the message automatically disappears after a certain period of time. After the third acquaintance's consent, his or her accurate location information may be checked in a map, and the map returns to an original state thereof after a certain period of time.

When the location-sharing acquaintance receiving the paid check consents to identification, a chat room may be opened in addition to display of the location-sharing acquaintance's identification information and location information. When it is known who the location-sharing acquaintance is due to the location-sharing acquaintance's consent, a chat room is opened. However, when a certain period of time passes without conversation in the chat room, a screen may return to an original state thereof in which only a distance is displayed.

According to an exemplary embodiment of the present invention, the method may further include a paid location-sharing acquaintance location information providing process S350 in which the acquaintance location sharing application provides only the location information of location-sharing acquaintances present within the proximity radius of the user without identification information of the location-sharing acquaintances in return for a payment. In other words, when a payment is made while only separation distances of location-sharing acquaintances are displayed as shown in (a) of FIG. 6, only location information of the location-sharing acquaintances is additionally displayed without identification information (e.g., names) as shown in (b) of FIG. 6. The identification information of the location-sharing acquaintances may also be displayed only when the user who checks the location information is permitted by the location-sharing acquaintances through a paid message. The paid message may automatically disappear after a certain period of time.

Meanwhile, when the number of counterparts who use the location sharing service of the present invention increases, it is necessary to make groups and efficiently manage the counterparts. For example, acquaintances may be classified into two or three groups, and only groups, the number, and distances of acquaintances, for example, three people in A group, two people in B group, and five people in C group, may be checked in the service.

To this end, in the location-sharing acquaintance distance display process S330, when a payment is made, location-sharing acquaintances are grouped by their acquaintance attributes, and only separation distances of location-sharing acquaintances belonging to any one group may be displayed. Grouping by acquaintance attributes may be, for example, family grouping, friend grouping, colleague grouping, and the like.

Further, acquaintances may not be grouped by acquaintance attributes and may be automatically grouped as the number of acquaintances increases. In other words, only one group is provided at first, and groups are additionally provided one by one as the number of acquaintances who register the user and are registered by the user increases. For example, a total of two groups are provided when the number of acquaintances exceeds fifty, and a total of three groups are provided when the number of acquaintances exceeds one hundred.

For reference, a single group operates (is activated) only when the group includes a minimum number of people (e.g., five people). This is intended to prevent a case in which it is possible to directly know who an acquaintance is because a group includes only one person.

The method of displaying only separate distances of location-sharing acquaintances belonging to any one group may be performed in the following two ways.

In one way, only separate distances of location-sharing acquaintances belonging to a group selected by the user may be displayed. For example, when the user selects A group as shown in (a) of FIG. 7, only separation distances of location-sharing acquaintances belonging to A group may be displayed, and when the user selects B group as shown in (b) of FIG. 7, only separation distances of location-sharing acquaintances belonging to A group may be displayed. Therefore, the user can easily find separation distances of location-sharing acquaintances belonging to a desired group.

In another way, only separate distances of location-sharing acquaintances belonging to a group determined on the basis of a current location may be displayed. For example, when the user is present in a company, only separation distances of location-sharing acquaintances belonging to a company colleague group within the proximity radius from the company may be displayed, and when the user is present in a bustling place, such as Gangnam station, rather than a company, only separation distances of location-sharing acquaintances belonging to a friend group within the proximity radius from Gangnam station may be displayed. Accordingly, even when the user does not select any group, it is possible to easily display separation distances of location-sharing acquaintances required by the user. When a location-sharing acquaintance who is a counterpart gives his or her consent through a paid identification message, accurate location information of the location-sharing acquaintance may also be displayed.

Meanwhile, when separation distances of location-sharing acquaintances are displayed according to groups as described above, a location-sharing acquaintance belonging to a group may deviate from or come within a set proximity radius. In this case, an alarm warning about the deviation or appearance may be output to maximize efficiency.

For example, when the user goes up a mountain, some previously registered location-sharing acquaintances may deviate from the proximity radius of the user. In this case, a deviation alarm warns the user about the deviation, and thus it is possible to prevent the danger of deviating from a path during mountaineering.

To this end, according to an exemplary embodiment of the present invention, when a location-sharing acquaintance belonging to a group selected by the user or determined on the basis of a current location of the user deviates from the proximity radius on the basis of the current location, the acquaintance location sharing application raises a group member deviation alarm. Therefore, when the user deviates from his or her mountaineer party during mountaineering, a deviation alarm is immediately received, and the user can immediately know his or her own deviation from a mountaineering path.

Likewise, when a location-sharing acquaintance belonging to a group selected by the user or determined on the basis of the current location of the user comes within the proximity radius on the basis of the current location, the acquaintance location sharing application raises a group member return alarm. Therefore, when the user deviates from his or her mountaineer party and returns during mountaineering, a return alarm is immediately received.

Further, when a location-sharing acquaintance belonging to a group selected by the user or determined on the basis of the current location of the user deviates from the proximity radius on the basis of the current location of the user, the location information providing server 300 transmits a deviation notification message to the location-sharing acquaintance who deviates from the proximity radius on the basis of the current location of the user. Therefore, when the user is a mountaineering leader, a location-sharing acquaintance who deviates from the proximity radius of the user receives a deviation notification message and may immediately know of his or her deviation.

According to exemplary embodiments of the present invention, only a distance between a user and his or her acquaintance is displayed for the user even when the acquaintance consents to provide location information, and acquaintance location information is provided only when the acquaintance gives his or her consent. Therefore, it is possible to strengthen the protection of private information. Also, according to exemplary embodiments of the present invention, a location notification message is transmitted in return for a payment. Therefore, it is possible to achieve the protection of private information and also create profit for a service provider. Further, according to exemplary embodiments of the present invention, when a location-sharing acquaintance who belongs to a group selected by a user or determined on the basis of a current location deviates from a proximity radius or comes within the proximity radius on the basis of the current location of the user, an alarm is raised. Therefore, it is possible to immediately know of deviation or return of acquaintances who move together.

The above-described embodiments of the present invention are most preferred embodiments selected from among various applicable exemplary embodiments and proposed to aid in understanding of those of ordinary skill in the art. The technical spirit of the present invention is not limited or restricted by the exemplary embodiments, and various modifications, alterations, and other equivalent embodiments are possible without departing from the technical spirit of the present invention.

What is claimed is:

1. A method of providing location information of an acquaintance by an acquaintance location sharing application installed in a user terminal, the method comprising:
    a location-sharing acquaintance registration process in which the acquaintance location sharing application registers counterparts who consent to provide their location information as location-sharing acquaintances of a user with a location information providing server;
    a location-sharing acquaintance location information receiving process in which the acquaintance location sharing application receives location information of location-sharing acquaintances who are present within a preset proximity radius from a current location of the user from the location information providing server;
    a location-sharing acquaintance distance display process in which the acquaintance location sharing application displays only a number and separation distances of location-sharing acquaintances who are present within the proximity radius of the user without identification information of the location-sharing acquaintances as long as the location-sharing acquaintances are present within the proximity radius;
    a paid location-sharing acquaintance identification information providing process in which the acquaintance location sharing application provides the identification information of the location-sharing acquaintances who are present within the proximity radius of the user in return for a payment; and
    a paid location-sharing acquaintance location information providing process in which the acquaintance location sharing application provides the location information of the location-sharing acquaintances who are present within the proximity radius of the user in return for a payment without the identification information of the location-sharing acquaintances,
    wherein the paid location-sharing acquaintance identification information providing process comprises:
    when the user selects a location-sharing acquaintance present within the proximity radius, transmitting, by the acquaintance location sharing application, a paid identification message to the selected location-sharing acquaintance; and
    when the location-sharing acquaintance who receives the paid identification message consents to identification, displaying, by the acquaintance location sharing application, identification information and location information of the location-sharing acquaintance,
    wherein the proximity radius is not changed by the user at will and is changeable in return for a payment,
    when the proximity radius of the user differs from a proximity radius of a location-sharing acquaintance and when the user and the location-sharing acquaintance are within a common proximity radius, location information of the location-sharing acquaintance is displayed anonymously, and
    wherein the location-sharing acquaintance distance display process comprises when a payment is made, grouping the location-sharing acquaintances and displaying only separation distances of location-sharing acquaintances belonging to a group selected by the user or a group determined on the basis of the current location,
    wherein the grouping comprises grouping the location-sharing acquaintances by their acquaintance attributes or automatically grouping the location-sharing acquaintances with an increase in number of acquaintances, and
    a group is activated when the group includes a preset number of people or more.

2. The method of claim 1, further comprising raising, by the acquaintance location sharing application, a deviation alarm when a location-sharing acquaintance belonging to a group selected by the user or determined on the basis of the current location deviates from the proximity radius on the basis of the current location of the user and raising a return alarm when the location-sharing acquaintance comes within the proximity radius on the basis of the current location of the user.

3. The method of claim 2, further comprising transmitting, by the location information providing server, a deviation notification message for notifying of deviation to the location-sharing acquaintance who deviates from the proximity radius on the basis of the current location of the user.

4. The method of claim 1, further comprising, when the location-sharing acquaintance consents to identification, opening a chat room between the user and the location-sharing acquaintance to display the identification information and the location information of the location-sharing acquaintance and, when a certain period of time passes without conversation after the chat room is opened, displaying only a distance as is originally done.

5. The method of claim 1, wherein the paid location-sharing acquaintance identification information providing process further comprises giving points to the location-sharing acquaintance who consents to identification.

\* \* \* \* \*